US008832462B2

(12) United States Patent
Trimberger (10) Patent No.: US 8,832,462 B2
(45) Date of Patent: *Sep. 9, 2014

(54) PROTECTING AGAINST DIFFERENTIAL POWER ANALYSIS ATTACKS ON SENSITIVE DATA

(75) Inventor: Stephen M. Trimberger, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 730 days.

This patent is subject to a terminal disclaimer.

(21) Appl. No.: 12/877,968

(22) Filed: Sep. 8, 2010

(65) Prior Publication Data

US 2012/0060038 A1 Mar. 8, 2012

(51) Int. Cl.
*G06F 11/30* (2006.01)
*G06F 12/14* (2006.01)
*G06F 11/00* (2006.01)

(52) U.S. Cl.
USPC ............................................ 713/189; 726/22

(58) Field of Classification Search
None
See application file for complete search history.

(56) References Cited

U.S. PATENT DOCUMENTS

| | | | |
|---|---|---|---|
| 5,598,424 A | 1/1997 | Erickson et al. | |
| 6,118,869 A | 9/2000 | Kelem et al. | |
| 6,181,164 B1 | 1/2001 | Miller | |
| 6,188,766 B1 | 2/2001 | Kocher | |
| 6,278,783 B1 | 8/2001 | Kocher et al. | |
| 6,298,442 B1 | 10/2001 | Kocher et al. | |
| 6,304,658 B1 | 10/2001 | Kocher et al. | |
| 6,327,661 B1 | 12/2001 | Kocher et al. | |
| 6,381,699 B2 | 4/2002 | Kocher et al. | |
| 6,510,518 B1 | 1/2003 | Jaffe et al. | |
| 6,539,092 B1 | 3/2003 | Kocher | |
| 6,640,305 B2 | 10/2003 | Kocher et al. | |
| 6,654,884 B2 * | 11/2003 | Jaffe et al. | 713/168 |
| 6,654,889 B1 * | 11/2003 | Trimberger | 713/191 |
| 6,931,543 B1 | 8/2005 | Pang et al. | |
| 6,978,370 B1 | 12/2005 | Kocher | |
| 7,039,816 B2 | 5/2006 | Kocher et al. | |
| 7,117,373 B1 | 10/2006 | Trimberger et al. | |
| 7,146,501 B2 | 12/2006 | Tanaka | |
| 7,373,668 B1 | 5/2008 | Trimberger | |
| 7,506,165 B2 | 3/2009 | Kocher et al. | |

(Continued)

FOREIGN PATENT DOCUMENTS

EP 1873 671 A1 1/2008

OTHER PUBLICATIONS

U.S. Appl. No. 12/791,608, filed Jun. 1, 2010, Bridgford et al.
U.S. Appl. No. 12/877,958, filed Sep. 8, 2010, Trimberger.

(Continued)

*Primary Examiner* — Krista Zele
*Assistant Examiner* — Matthew Lindsey
(74) *Attorney, Agent, or Firm* — LeRoy D. Maunu (57) ABSTRACT

An embodiment of a method is disclosed for protecting sensitive data from discovery during an operation performed on input data with the sensitive data. This embodiment of the method includes performing the operation on a first quantity of random data with the sensitive data using a circuit arrangement before performing the operation with the sensitive data on the input data using the circuit arrangement. After performing the operation with the sensitive data on the first quantity of the random data, the operation is performed with the sensitive data on the input data using the circuit arrangement. After performing the operation with the sensitive data on the input data, the operation is performed with the sensitive data on a second quantity of random data using the circuit arrangement.

18 Claims, 10 Drawing Sheets

(56) References Cited

U.S. PATENT DOCUMENTS

| | | |
|---|---|---|
| 7,587,044 B2 | 9/2009 | Kocher et al. |
| 7,599,488 B2 | 10/2009 | Kocher et al. |
| 7,606,364 B1 | 10/2009 | Shih |
| 7,607,025 B1 | 10/2009 | Trimberger |
| 7,634,083 B2 | 12/2009 | Kocher et al. |
| 7,668,310 B2 | 2/2010 | Kocher et al. |
| 7,787,620 B2 | 8/2010 | Kocher et al. |
| 7,792,287 B2 | 9/2010 | Kocher et al. |
| 2001/0002486 A1 | 5/2001 | Kocher et al. |
| 2001/0023484 A1* | 9/2001 | Ichimura ................... 713/193 |
| 2001/0053220 A1 | 12/2001 | Kocher et al. |
| 2002/0099948 A1 | 7/2002 | Kocher et al. |
| 2003/0028771 A1 | 2/2003 | Kocher et al. |
| 2005/0041809 A1 | 2/2005 | Fischer et al. |
| 2005/0105366 A1 | 5/2005 | Pedlow, Jr. |
| 2005/0183072 A1* | 8/2005 | Horning et al. ............. 717/140 |
| 2006/0294018 A1 | 12/2006 | Tuoriniemi |
| 2007/0033419 A1 | 2/2007 | Kocher et al. |
| 2008/0019507 A1* | 1/2008 | Fontana et al. ............ 380/28 |
| 2008/0037781 A1 | 2/2008 | Kocher et al. |
| 2008/0049935 A1 | 2/2008 | Kocher et al. |
| 2008/0101604 A1 | 5/2008 | Kocher et al. |
| 2008/0130886 A1 | 6/2008 | Kocher et al. |
| 2008/0133938 A1 | 6/2008 | Kocher et al. |
| 2008/0137848 A1 | 6/2008 | Kocher et al. |
| 2008/0232597 A1 | 9/2008 | Mare |
| 2009/0323932 A1* | 12/2009 | Youn ........................... 380/30 |
| 2010/0125739 A1 | 5/2010 | Creary et al. |
| 2010/0150344 A1* | 6/2010 | Karroumi et al. ........... 380/45 |
| 2011/0002460 A1* | 1/2011 | Michaels et al. ............ 380/37 |

OTHER PUBLICATIONS

U.S. Appl. No. 12/900,805, filed Oct. 8, 2010, Bridgford et al.

Xilinx, Inc. "Virtex-5 FPGA Configuration User Guide", UG191 (v3.9.1) Aug. 20, 2010, Chapter 6, pp. 1-166, www.xilinx.com, Xilinx, Inc., 2100 Logic Drive, San Jose, CA, US.

\* cited by examiner

PROTECTING AGAINST DIFFERENTIAL POWER ANALYSIS ATTACKS ON SENSITIVE DATA

FIELD OF THE INVENTION

An embodiment of the present invention generally relates to protecting against attacks that attempt to discover a decryption key through differential power analysis.

BACKGROUND

Programmable logic circuits are integrated circuits (ICs) that are user configurable and capable of implementing digital logic operations. There are several types of programmable logic ICs, including Complex Programmable Logic Devices (CPLDs) and Field Programmable Gate Arrays (FPGAs). CPLDs include function blocks based on programmable logic array (PLA) architecture and programmable interconnect lines to route and transmit signals between the function blocks. FPGAs include configurable logic blocks (CLBs) arranged in rows and columns, input/output blocks surrounding the CLBs, and programmable interconnect lines that route and transmit signals between the CLBs. Each CLB includes look-up tables and other configurable circuitry that is programmable to implement a logic function. The function blocks of CPLDs, CLBs of FPGAs and interconnect lines are configured by data stored in a configuration memory of the respective devices.

Designs implemented in programmable logic have become complex. Due to the time and investment required for design and debugging, it is desirable to protect the design from unauthorized copying. Efforts have been made to encrypt designs and provide the encrypted designs to the target devices. Several encryption algorithms, for example, the standard Data Encryption Standard (DES) and the more secure Advanced Encryption Standard (AES) algorithms, are known for encrypting blocks of data. Additionally, a one-time encryption pad may be used as a cipher for encrypting blocks of data by XORing blocks of data with blocks of the one-time pad (OTP). These approaches require provision of a key to the structure that decrypts the design, and the key must be protected from unauthorized discovery A decryption key can be stored in nonvolatile memory of a programmable integrated circuit. An encrypted bitstream can then be loaded into the IC and decrypted using the key within the programmable logic. A configuration controller circuit is included in the IC to decrypt each frame of the encrypted bitstream and program configuration memory of the IC using the decrypted frames. In this manner, an attacker is prevented from reading the bitstream as it is being loaded into the programmable logic IC. However, this structure must also protect from modes of attack in which the attacker attempts to obtain the decryption key stored in the programmable IC. If the attacker obtains the decryption key, the attacker can decrypt an intercepted bitstream to reveal the unencrypted design.

One method through which an attacker may attempt to discover the decryption key is known as power analysis. In a power analysis attack, current used by a device is monitored while the device is operating. During normal operation, the amount of power used by a device varies depending on the logic gates activated at a given time. By monitoring variations in the power consumption while the device is performing some operation with sensitive data, for example decrypting a configuration bitstream, the attacker can identify operations that are performed and determine the decryption key or other sensitive data.

One or more embodiments of the present invention may address one or more of the above issues.

SUMMARY

One or more embodiments of the invention provide approaches for protecting sensitive data from discovery during an operation performed with the sensitive data on input data. In one embodiment, a method performs the operation on a first quantity of random data with the sensitive data using a circuit arrangement before performing the operation with the sensitive data on the input data using the circuit arrangement. After performing the operation with the sensitive data on the first quantity of the random data, the method performs the operation with the sensitive data on the input data using the circuit arrangement. After performing the operation with the sensitive data on the input data, the method performs the operation with the sensitive data on a second quantity of random data using the circuit arrangement.

A circuit arrangement is provided in another embodiment. The circuit arrangement includes a controller configured to provide input data, sensitive data, and random data. A processing circuit is coupled to receive the input data, the sensitive data, and the random data. The processing circuit is configured to perform an operation with the sensitive data on a first quantity of the random data before performing the operation on the input data with the sensitive data. The processing circuit is further configured to perform the operation with the sensitive data on a second quantity of the random data after performing the operation with the sensitive data on the input data.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION OF THE DRAWINGS

During configuration of programmable logic, the configuration bitstream data can be intercepted and used to make unauthorized copies of the design. Although the configuration bitstream can be encrypted, the decryption key or other sensitive data may be vulnerable to discovery through brute-force trial-and-error attacks or side-channel attacks such as analysis of electromagnetic radiation or power analysis. In a power analysis attack, current used by a device is monitored over time. During normal operation, the amount of power used by a device varies depending on the logic gates activated at a given time. By monitoring variations in the power consumption during the decryption process, the attacker can identify operations that are performed and determine the decryption key. One or more embodiments of the present invention provide countermeasures that may be implemented with software or hardware to improve resistance to power analysis attacks.

In a simple power analysis (SPA) attack, current used by a device is monitored over time. During normal operation, the amount of power used by a device varies depending on the logic gates activated at a given time. By monitoring variations in the power consumption, the attacker can identify different operations that are performed. For example, if a programmable IC implements DES encryption, sixteen rounds of encryption/decryption are performed on each block of data. Because similar operations are performed for each round, power consumption data can be identified for each round. Comparison of power consumption of different rounds can identify key-dependent operations and, ultimately, the key used for decryption. For example, the DES key schedule is produced by rotating 28-bit key registers. The rotations are generally implemented using a right shift operation where a zero is shifted into the most significant bit by default. If the bit of the key shifted out of the register is a one, an additional operation is needed to cause the most significant bit to be equal to one. Therefore, a different power signature will be produced for each rotation depending on the bit of the decryption key.

In a differential power analysis (DPA) attack the difference in the power consumption between decrypting two different blocks of ciphertext can be used to extract information about the key. For example, in one step in many encryption and decryption operations, the ciphertext, or a value deterministically derived from the ciphertext, is EXCLUSIVE-ORed (XOR) with the key or a subkey derived deterministically from the key. An attacker can observe the ciphertext and can watch for the difference in power consumption between those ciphertext values expected to produce a 1 output from the XOR versus those expected to produce a 0, for some assumption of the key value. The attacker may attempt a large number of executions of the decryptor by providing a large amount of data to be decrypted. The attacker guesses a key value and averages together the subset of the power traces of those executions of the decryptor that are expected to produce the same value from the XOR function if the guess was correct. If that result differs significantly from the average of all executions of the decryptor, the attacker can conclude that the guess of the key value was correct. If incorrect, the attacker assumes a different key value and averages different subsets of the power traces from the large number of trials. This attack requires a large number of trials to ensure success.

As used herein, a power signature may be referred to as power fluctuations, a power consumption signature, or a power consumption waveform, and such terms are used interchangeably herein. Other encryption ciphers, including both symmetric and asymmetric ciphers, also include key dependent operations that are susceptible to power analysis. One skilled in the art will recognize that one or more embodiments of the present invention are applicable to protecting key data or other sensitive data used by a number of synchronous and asynchronous encryption and decryption algorithms such as DES, DES-3, Blowfish, RSA, DSA, etc. as well as other algorithms that merely handle decrypted sensitive data.

Throughout this description references are made to keys or key data. Those skilled in the art will recognize that key data is one example of data that is intended to be protected. Other kinds of data fall within the scope of one or more embodiments of this invention. Also, reference is made to encryption and decryption throughout the description. Those skilled in the art will recognize that these are examples of operations performed using key data, where the key data is an example of data that must be kept secret. Though an example application and embodiment involving decryption is described, operations other than decryption fall within the scope of one or more embodiments of the present invention.

One or more embodiments of the invention provide protection against attempts to learn the decryption key by way of differential power analysis (DPA) while attempting to decrypt a large data stream as well as attempts to learn the decryption key by way of repeatedly attempting to decrypt using small data streams. An example scenario in which one or more embodiments of the invention protect against attempts to discover a decryption key by way of differential power analysis involves configuration bitstreams directed to programmable integrated circuits (ICs) such as field programmable gate arrays (FPGAs). The bitstream for an FPGA is of a known length, and this amount of data is provided as input for configuring the FPGA. The length of the bitstream is indicated by a value in the bitstream. In an attempt to gather a sufficient amount of power analysis data, an attacker may specify a length value in the bitstream that is greater than the number of bits required to fully configure the target FPGA. In order to circumvent this type of attack, one or more embodiments of the invention perform consistency checks on decrypted data near the beginning of an input bitstream. In response to detecting an inconsistency, countermeasures are taken. For example, an alternative key may be used while continuing the decryption process, thereby hiding use of the true key and making any data gathered from differential power analysis irrelevant to the true key. In another embodiment, an alternative data stream may be substituted for the attacker's data stream, resulting in the true key being hidden from differential power analysis. To protect against attempts to learn the decryption key by way of repeatedly attempting to decrypt using small data streams, an embodiment of the invention responds to a failure to configure by waiting for a selected period of time before permitting another attempt to configure with an encrypted data stream. Since thousands of failed decryption attempts would be required for an attacker to learn the key, the accumulation of the delays between attempts may make a differential power attack infeasible.

In another embodiment, protection is provided against repeated attacks using small data streams. In these types of attacks on a programmable integrated circuit (IC) such as a field programmable gate array (FPGA), the attacker inputs a short data stream to the device and gathers the data through power analysis while the device is operating on the input data stream. The device is then rebooted and another data stream input. The rebooting may entail cycling power to the device or another device-specific action that results in resetting the device such that the device reinitializes and process the next data of an input data stream as the beginning of a data stream. For an FPGA, the rebooting causes the FPGA to load a configuration bitstream for configuring the programmable logic and routing resources. To protect against these types of attacks, decryption of the actual first block of data is obscured by first decrypting some number of blocks of random or pseudo-random data, decrypting the first block, followed by decrypting some number of blocks of random or pseudo-random data again, and then checking consistency of the decrypted data. If the decrypted data are inconsistent, the countermeasures described above may be invoked.

Figure 1:
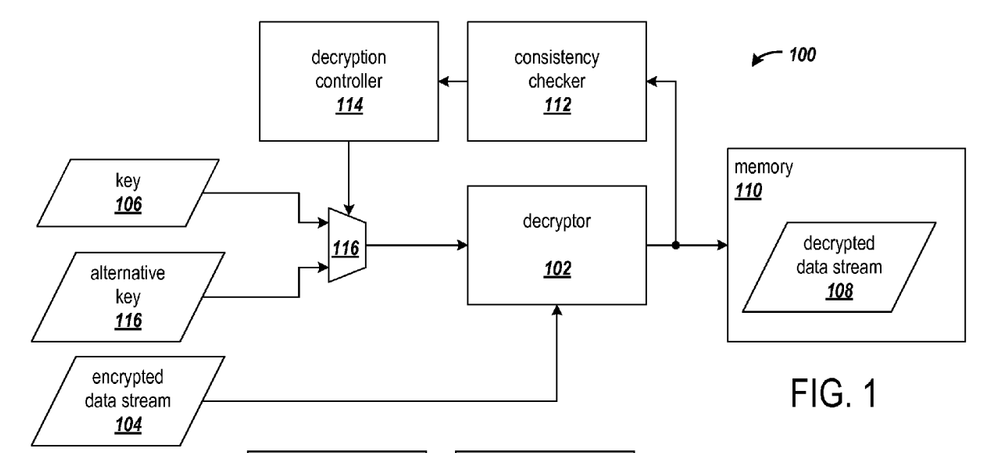
FIG. 1 is a block diagram of a decryption circuit arrangement in accordance with one embodiment of the invention.

FIG. 1 is a block diagram of a decryption circuit arrangement in accordance with one embodiment of the invention. The decryption circuit arrangement 100 uses an alternative key in response to the decryption controller finding that decrypted data fails a consistency check. The decryptor circuit arrangement includes decryptor 102 that decrypts an input data stream 104 using key 106. In one embodiment, the decrypted data stream 108 is stored in memory 110. In another embodiment, the decrypted data stream may be transmitted to other circuitry. Consistency checker 112 determines whether or not the decrypted data is consistent with expected results. The decryption controller 114 is coupled to the consistency checker 112 and controls selection of either the actual key 106 or the alternative key 116 for use by the decryptor 102. Initially, the decryption controller 114 selects the key 106 for use by the decryptor 102, and the decryptor 102 continues use of that key until the consistency check of the decrypted data fails. In response to the consistency checker finding that the decrypted data is not as expected and signaling the occurrence to the decryption controller, which signals tampering is suspected, the decryption controller selects the alternative key for input to the decryptor via selector 116. Further decryption of the input data stream by decryptor is performed using the alternative key. Thus, unbeknownst to the attacker the decryptor circuit arrangement 100 switches to use the alternative key while the attack is underway, which causes meaningless data to be gathered by the attacker.

The alternative key 116 may be a pre-programmed constant value, a random number, or the output of the decryptor 102, for example. In another embodiment, the effect of an alternative key is to interfere with the key schedule used by the decryptor. For example, the scheduled key values may set to 0's or overwritten with alternative data.

In one embodiment, the consistency checker performs a cyclic redundancy check (CRC) early in the input data stream. For example, the data stream may include a CRC code in the first block of the data stream, and the consistency checker checks whether or not a CRC code computed on the first block matches the value in the block. Thus, early in the decryption process the consistency checker is able to signal whether or not a decryption attack is likely to be underway. For an attack in which a long data stream is used, the approach responds to the attack early in the data stream, thereby reducing the likelihood that an attacker will be able to discover the key with ongoing power analysis of a long data stream. In another embodiment, a CRC code or a hash value for authentication may be included in every block of the encrypted data stream.

In another embodiment, the first block of the data stream may include a password to be verified by the consistency checker 112. If the consistency checker finds that the first block of the decrypted data stream does not include a password that matches the expected password, the consistency checker signals the failure of the consistency check to the decryption controller. In response, the decryption controller 114 selects the alternative key 116 for use by the decryptor 102. The desired password is loaded onto the device containing the arrangement 100 using a boundary scan interface, for example. For a legal data stream, the tools (e.g., electronic circuit design tools) that generate the data stream include the password in the data stream and encrypt the data stream.

An alternative embodiment has the consistency checker 112 configured to check the first decrypted block of the data stream for an expected sequence of instructions. In a data stream such as a configuration bitstream directed to a programmable logic integrated circuit (IC), the first block, or the first few blocks, of the bitstream is expected to have a particular sequence of instructions for commencing decryption and configuring the programmable logic. An attacker's data stream may lack the specific sequence of instructions, and the absence of the sequence of instructions in the decrypted bitstream is detected by the consistency checker. In response to detecting that the expected sequence of instructions is not present in the decrypted data stream, the consistency checker signals the decryption controller 114 as to the failed consistency check, which indicates tampering is suspected. In response to the signal of the failed consistency check, the decryption controller selects the alternative key 116 for use by the decryptor.

In another embodiment, the consistency checker 112 is configured to periodically check for consistency of the decrypted data stream. In one embodiment, the consistency checker is configured to check every $n^{th}$ block for consistency. In another embodiment, the first block of the decrypted data stream may indicate the value of n. The consistency check may be performed irregularly in an alternative embodiment. Rather than checking the consistency of every $n^{th}$ block where n remains the same throughout the decryption, performing the consistency check irregularly varies n in a pseudo-random manner during the decryption. The irregular pattern of consistency checks may be controlled by a linear feedback shift register (LFSR) or a random number generator, for example.

Figure 2:
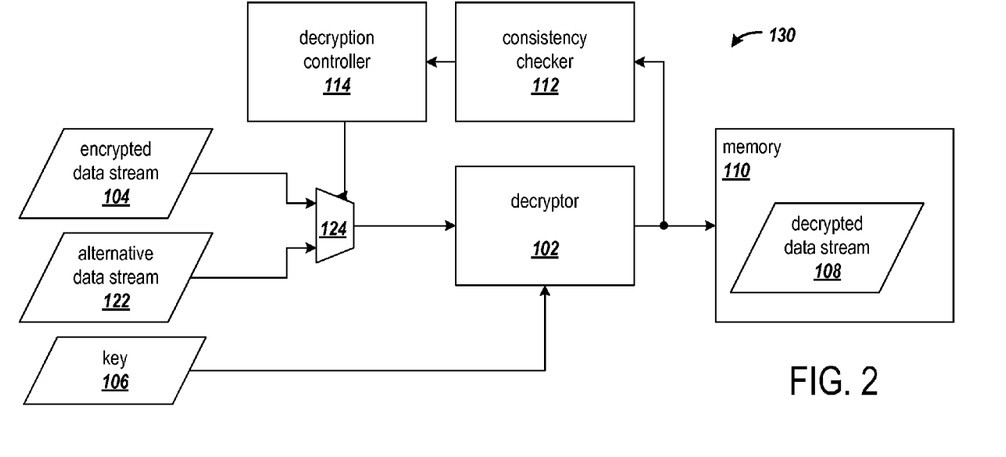
FIG. 2 is a block diagram of a decryption circuit arrangement in accordance with one embodiment of the invention.

FIG. 2 is a block diagram of a decryption circuit arrangement 130 in accordance with one embodiment of the invention. The arrangement shows the use of an alternative data stream 122 in response to the consistency checker 112 finding that decrypted data fails a consistency check. Instead of using an alternative key when there is a failure in consistency of the decrypted data stream as in the decryption circuit arrangement 100 of FIG. 1, the decryption controller 114 of decryption circuit arrangement 130 selects an alternative data stream 122, via selector 124, to be decrypted by decryptor 102. Thus, unbeknownst to the attacker the decryptor circuit arrangement 130 switches to use the alternative data stream while the attack is underway, which causes meaningless data to be gathered by the attacker. The decryption circuit arrangement 130 may be configured according to the different embodiments of the consistency checker 112 as described above in association with FIG. 1.

In one embodiment, the alternative data stream 122 may be generated by a random number generator (not shown). Alternatively, the alternative data stream may be a stream of constant values such as all 0's or alternating 1's and 0's.

The use of an alternative key and an alternative data stream may both be used in another embodiment of the invention.

Figure 3:
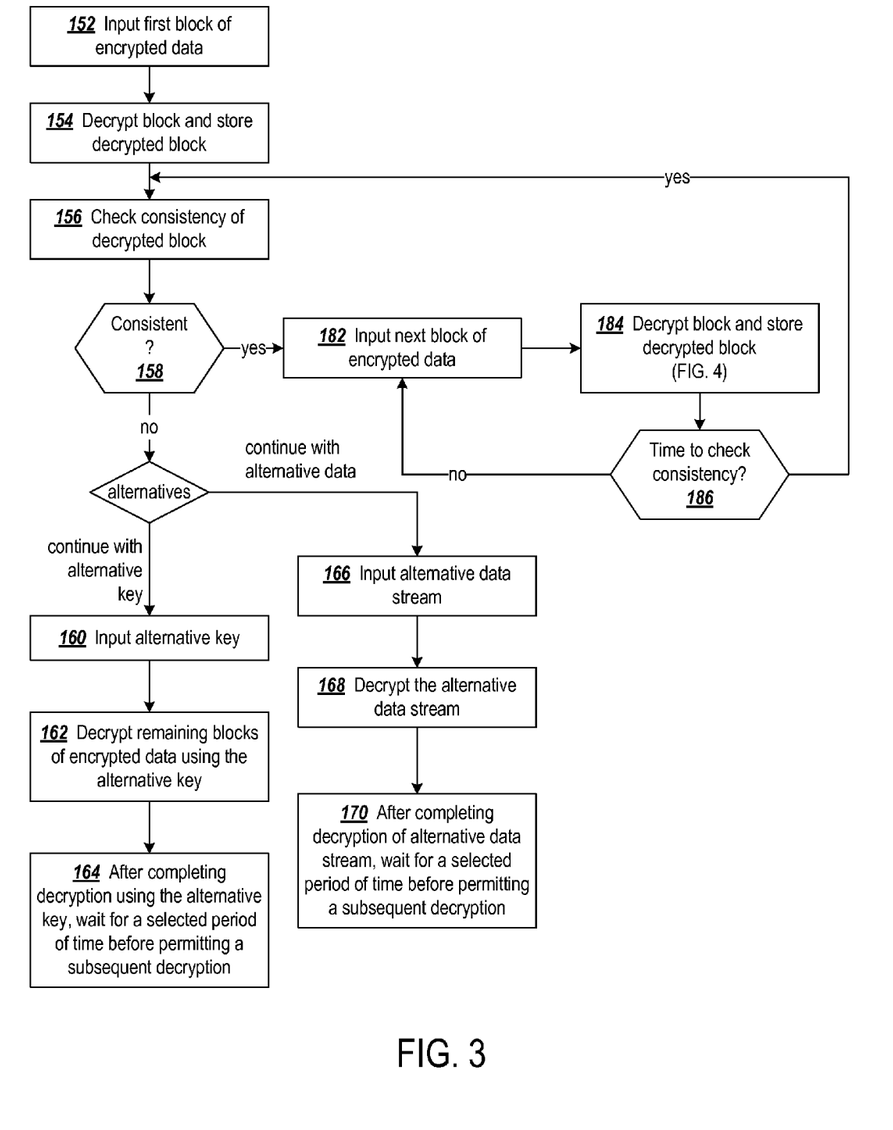
FIG. 3 is a flowchart of an example process for decrypting data in accordance with two or more embodiments of the invention.

FIG. 3 is a flowchart of an example process for decrypting data in accordance with two or more embodiments of the invention. The process shows an early consistency check performed on decrypted data. In response to a failed consistency check, the decryption process continues using an alternative key instead of the real key, or using an alternative data stream instead of the encrypted data stream. The use of an alternative key or use of an alternative data stream are alternative countermeasures.

At step 152 the first block of the encrypted data stream is input and the block is decrypted at step 154. Step 156 checks the consistency of the decrypted block using one of the alternatives described above in association with in FIG. 1.

If the block is not consistent, different countermeasures may be taken as described above in association with FIGS. 1 and 2. According to one embodiment, in response to detecting an inconsistency between the decrypted data and expected data, an alternative key is input at step 160 for use in continuing decryption. At step 162, the process continues decryption with the alternative key. After completing decryption with the alternative key, a waiting period may be enforced in order to delay the attacker in repeating the attack.

In another embodiment, the countermeasure may be to continue decryption using alternative data. At step 166, the alternative data are input, and step 168 continues the decryption using the alternative data instead of the attacker's data stream. After completing decryption of the alternative data stream, a waiting period may be enforced in order to delay the attacker in repeating the attack.

Both an alternative key and an alternative data stream may be used in combination in another embodiment. Additional countermeasures that may be taken in combination with use of an alternative key or alternative data include ceasing to store decrypted data (for example in a configuration memory of a programmable IC), burning an e-fuse to indicate an attack was detected, and/or clearing the real decryption key.

Returning now to decision step 158, if the first block of decrypted data passes the consistency check, the next block of the data stream is input at step 182 and decrypted and stored at step 184.

One or more blocks of the input data stream may be checked for consistency depending on the desired implementation. If only the first block is checked for consistency, then decision step 186 directs the process to step 182 to input the next block of the encrypted data stream since the first block was checked at step 156. In embodiments where there are multiple consistency checks during the decryption, decision step 186 determines whether or not the decrypted block should be checked. As described above, the consistency check may be performed periodically (every $n^{th}$ block) or irregularly (pseudo-randomly check). If the decrypted block is to be checked, decision step 186 directs the process to step 156 to check the consistency as described above.

Figure 4:
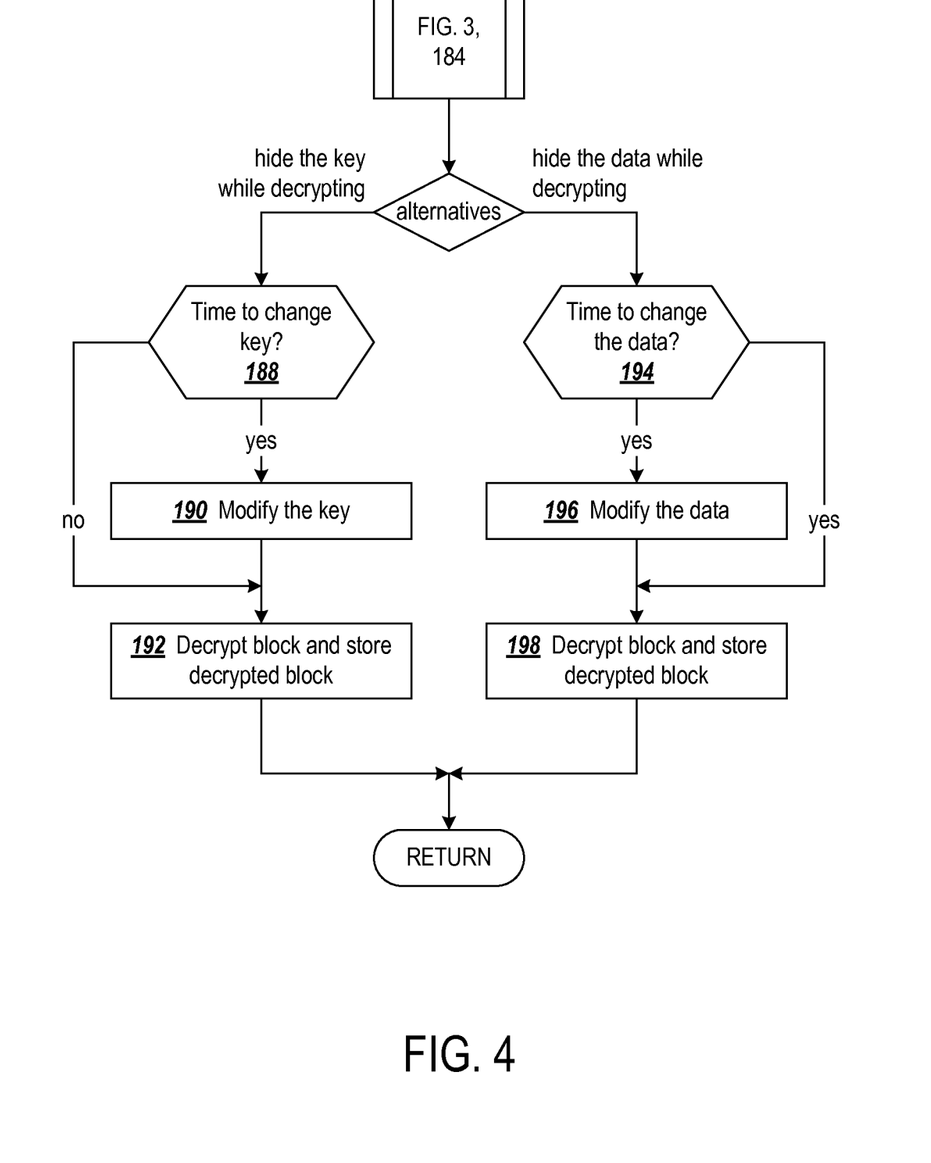
FIG. 4 is a flowchart of an example process for performing decryption in accordance with two embodiments of the invention that are directed to protecting against attacks that involve large data streams having legitimate data.

FIG. 4 is a flowchart of an example process for performing decryption in accordance with two embodiments of the invention that are directed to protecting against attacks that involve large data streams having legitimate data. A scenario of attack that is addressed by the embodiments of FIG. 4 is that of the attacker using a large data stream in which an early consistency check would not detect an inconsistency. The long data stream may afford the attacker the opportunity to gather enough data through differential power analysis to discover the key. The embodiments of FIG. 4 mask either the key or the encrypted data stream during the decryption process. One embodiment shown in FIG. 4 modifies the key during the decryption process. The alternative embodiment modifies the data during the decryption process.

The processes of FIG. 4 further describe the decryption step 184 of FIG. 3. One embodiment in FIG. 4 illustrates how the decryption may be obscured from differential power analysis attacks by modifying the key during decryption. The other embodiment in FIG. 4 shows how the decryption may be obscured by modifying the data during decryption.

According to one embodiment, the key is changed after every n blocks have been decrypted. If it is time to change the key, decision step 188 directs the process to step 190 to modify the key. In one embodiment, the key bits may be rotated such as in a circular shift register. Alternative modifications include passing the key value through an LFSR, XORing the bits of the key with an LFSR value, or using the decrypted data as the new key. At step 192, the block of data is decrypted and stored. It will be recognized that, while not shown, a count of blocks decrypted with a current key is maintained and reset when the key is modified.

In an alternative embodiment, the encrypted data stream may be changed after decrypting every n blocks. If it is time to modify the encrypted data stream, decision step 194 directs the process to step 196 where the data stream is modified.

In one embodiment, an input block of the data stream is rotated. Alternatively, the block of the data stream may be modified by XORing the bits of the block with bits of an LFSR.

In yet another embodiment, each block of the encrypted data stream may be modified by XORing that block with some other previously decrypted block of the data stream. For example, each of encrypted blocks n−1 through n+1000 is XORed with decrypted block n. For decrypting blocks n+1001 through n+2000, those encrypted blocks n+1001 through n+2000 are XORed with decrypted block n+1000. This process is extended to the remaining blocks of the data stream.

At step 198, the block of data is decrypted and stored. It will be recognized that, while not shown, a count may be maintained of blocks decrypted between modifying of a block, and the count is reset when the last block to be modified with a particular decrypted block has been modified. To support the embodiments of FIG. 4, the encrypted data stream must have been constructed to accommodate the modifications to the key or encrypted data that occur during the decryption process.

Figure 5:
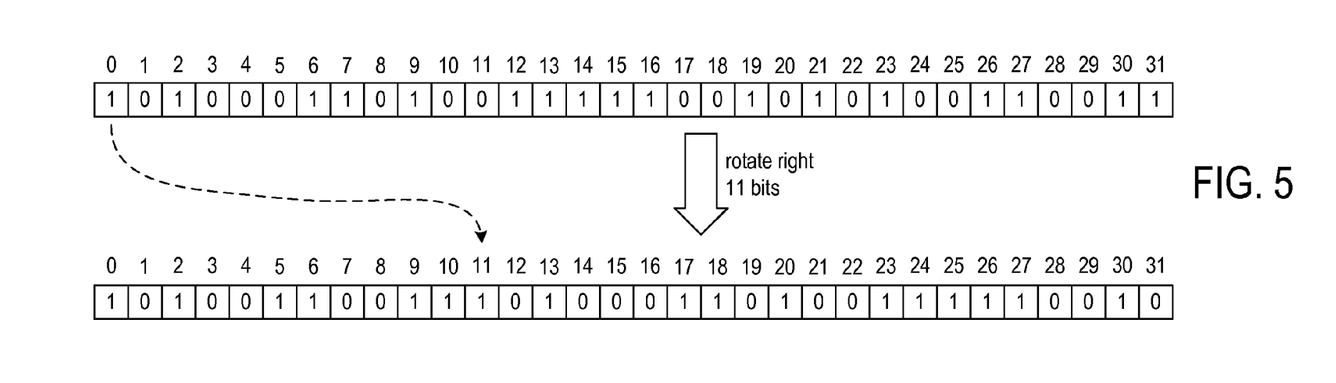
FIG. 5 shows an example in which the key bits have been rotated right.

FIG. 5 shows an example in which the key bits have been rotated right by 11 bits. For ease of illustration, the key is shown with only 32 bits. The value from bit 0 is rotated to bit 11, the value from bit 1 is rotated to bit 12, the value from bit 2 is rotated to bit 13, . . . , the value from bit 21 is rotated to bit 0, . . . , and the value from bit 31 is rotated to bit 10 The bits of the key may be rotated by a different number of bits and/or rotated left according to implementation requirements.

Figure 6:
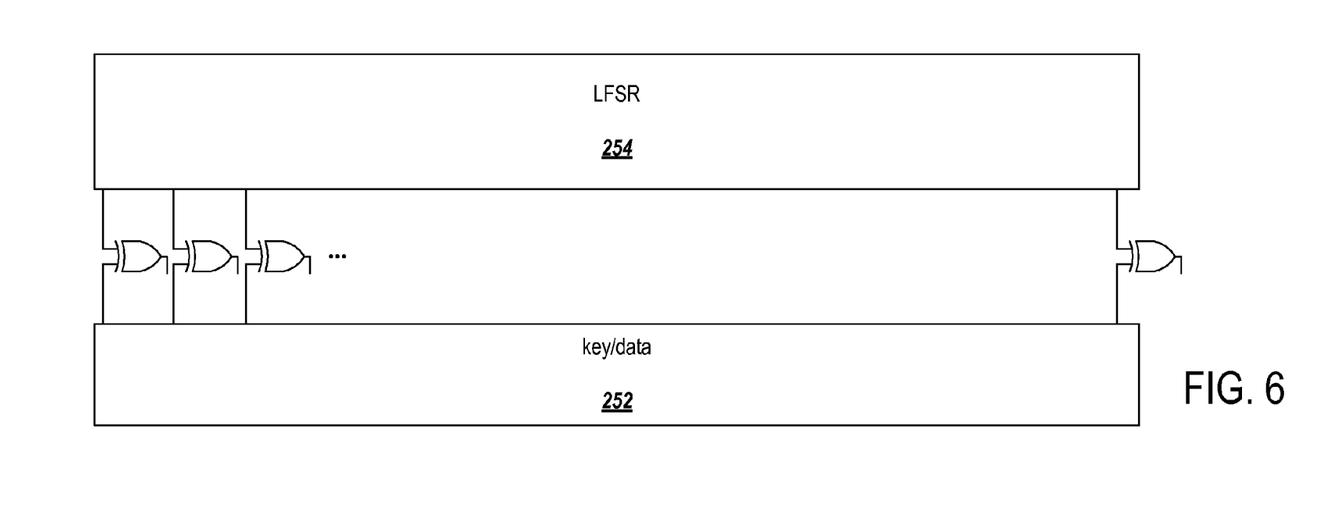
FIG. 6 shows an example in which bits of the key or data stream are XORed with taps from an LFSR.

FIG. 6 shows an example in which bits of the key or data stream 252 are XORed with taps from an LFSR 254. Other example embodiments, which are not illustrated, include passing the key through the LFSR (the key bits are taps off the LFSR). An example LFSR is described in U.S. Pat. No. 6,181, 164 to Miller.

Figure 7:
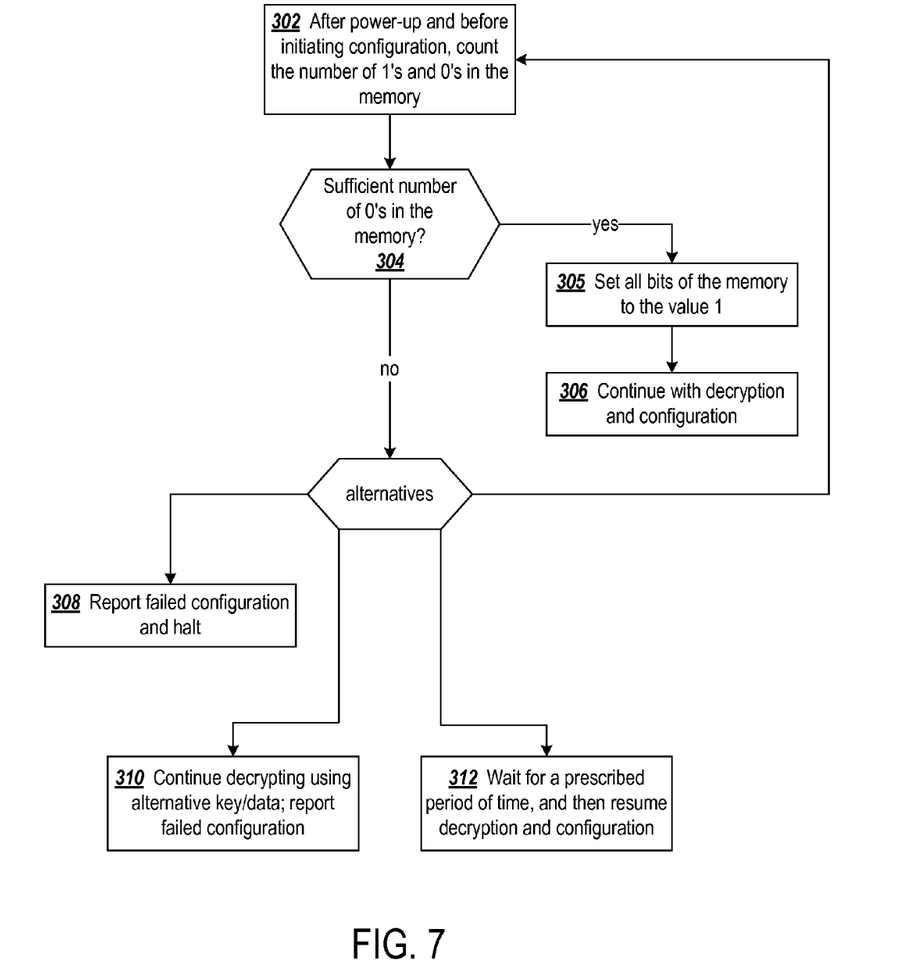
FIG. 7 shows a flowchart of an example process for limiting repeated trials of data streams in order to reduce exposure to iterative attacks such as trial-and-error brute force attacks or differential power analysis attacks.

FIG. 7 shows a flowchart of an example process for limiting repeated trials of data streams in order to reduce exposure to iterative attacks such as trial-and-error brute force attacks or differential power analysis attacks. In the process of FIG. 7, an attempted attack is detected at power up of a device by way of examining the number of bits having a value 1 versus the number of bits having a value 0 in a memory. If there is a sufficient proportion of bits with value 0, then fast power cycling of the device is less likely to have occurred, and the bits of the memory are all set to the value 1 in order to put the contents of the memory in a state suitable for detecting a subsequent fast cycling of power. If there is not a sufficient proportion of bits with value 0, then fast power cycling of the device is likely to have occurred, and countermeasures may be taken. In one embodiment, the decryption controller (FIG. 1, 2, #114) includes a volatile memory dedicated for use in identifying fast cycling of power to the device. The process shows four example alternatives for responding to a detected attack.

At step 302, the process counts the number of bits with value 1 and the number of bits of value 0 in the memory. If a sufficient number of the bits have the value 0, then the device is presumed to have been without power for a period of time that would not imply that a DPA is underway. The process proceeds to step 305, where all the bits of the memory are set to the value 1. At step 306, the decryption and configuration process continues.

In response to the memory not having a sufficient number of bits with the value 0, countermeasures may be taken to slow down the cycling of power and repeated attempts at DPA or brute-force attacks. It will be appreciated that the particular proportion of 0 values to 1 values that would trigger countermeasures may vary between different memories. Specifically, once power is removed the rate at which bits of one memory revert to 0 values may be greater than or less than the rate at which the bits of another memory revert to 0 values. If the bits of a memory are slow to revert to 0 values after power is removed, a lesser number of 0 values would be desired to trigger the countermeasures. In contrast, if the bits of a memory are fast to revert to 0 values after power is removed, a greater number of 0 values would be desired to trigger the countermeasures in order to ensure a sufficient period of time has passed before allowing the next decryption and configuration attempt.

In one embodiment, one countermeasure is to report the failed configuration attempt and halt the configuration process as shown by step 308. An alternative countermeasure is to continue decrypting using an alternative key and/or alternative data as shown in step 310 and described above. Step 312 shows another countermeasure in which a new decryption attempt is not permitted until a prescribed period of time has passed. Instead of waiting for a prescribed period of time, another countermeasure simply returns the process to decision step 302 to once again check the number of 0 values in the memory.

Figure 8:
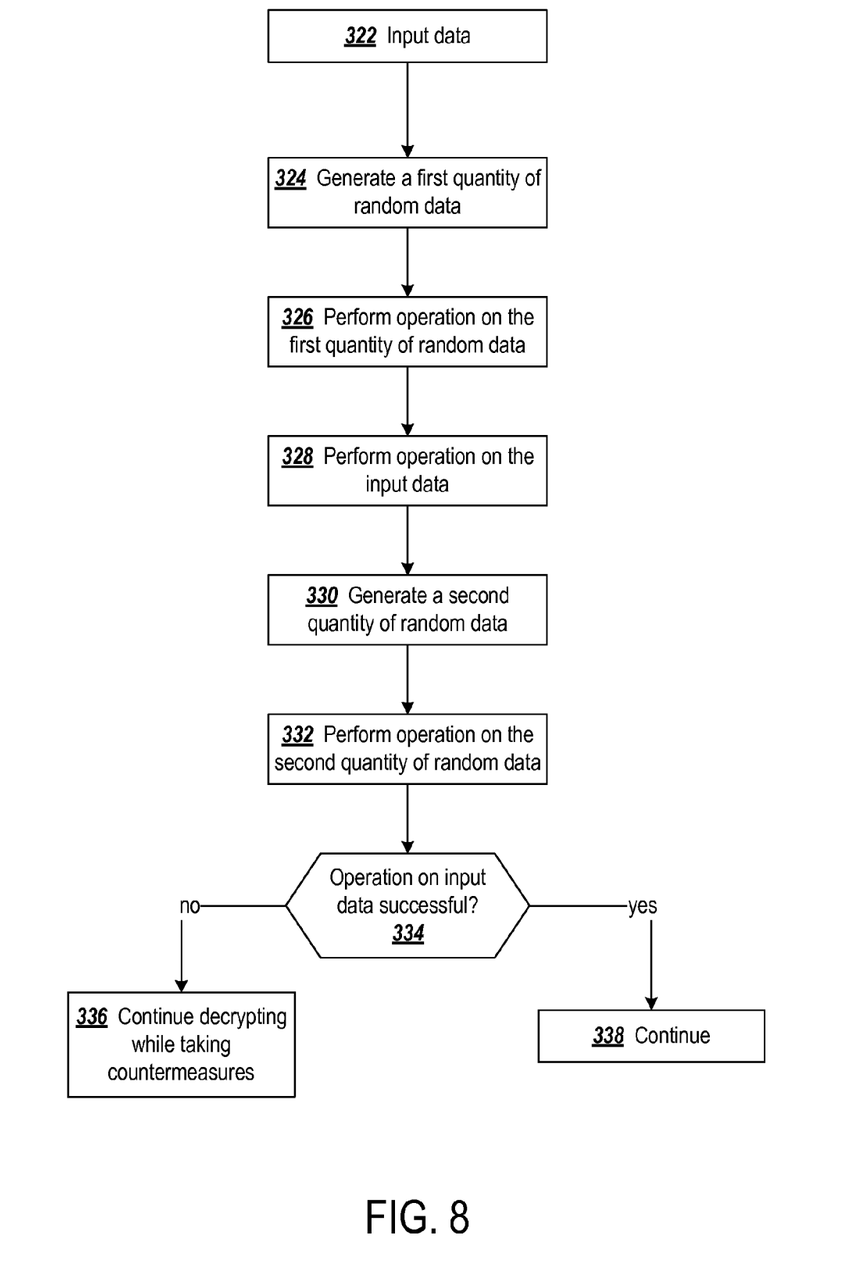
FIG. 8 is a flowchart of a process for hiding sensitive data while an operation is being performed on that sensitive data with a circuit arrangement.
Figure 9:
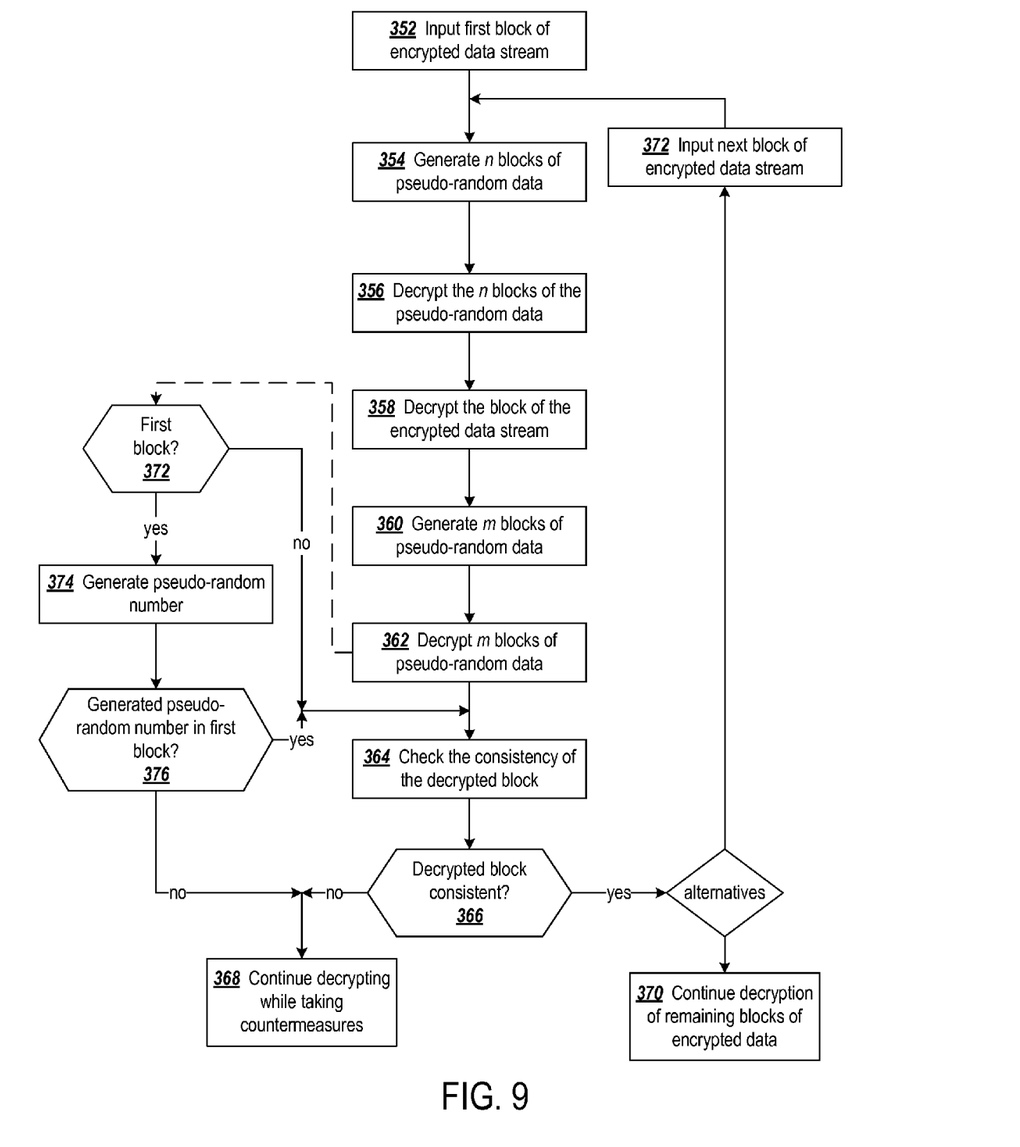
FIG. 9 is a flowchart of a process for decrypting data in accordance with one or more embodiments of the invention.

FIG. 8 is a flowchart of a process for hiding sensitive data while an operation is being performed on that sensitive data with a circuit arrangement. The embodiment of FIG. 8 may be applied to checking a password, for example, while the embodiment shown in FIG. 9 is directed to decryption operations. The password is the sensitive data being protected in FIG. 8, and the decryption key is the sensitive data being decrypted in FIG. 9.

In the embodiment of FIG. 8, the operation is hidden by performing an operation on a quantity of random or pseudo-random data prior to performing the operation on the first block, then performing the operation on the input block, and then performing the operation on some additional quantity of random or pseudo-random data. In this embodiment, "random data" will be used to refer to implementations using random data and to implementations using pseudo-random data.

Data are input at step 322, and a first quantity of random data is generated (or provided as input if previously stored) at step 324. The input data may contain only the password or the password in combination with additional application data. At step 326, the operation is performed on the first quantity of random data, and after that the operation is performed on the input data at step 328. In an example application and embodiment, the operation is checking whether the password in the input data is correct. The correct password is the sensitive data, and the operation involves comparing the correct password to the password in the input data. An additional quantity of random data is generated (or provided as input if previously stored) at step 330, and the operation is performed on those m blocks of random data at step 332. In one embodiment, n and m may be constant values. Alternatively, n and m may be pseudo-random values.

Step 334 checks whether the operation on the input block was successful. For example, the success may be indicated by a password check as performed at step 328. If the operation was not successful (e.g., the password was incorrect), decision step 334 directs the process to step 336 where countermeasures (previously described) are taken in continuing to perform operations on additional input data.

If the operation on the input data was successful, the process continues according to application requirements.

FIG. 9 is a flowchart of a process for decrypting data in accordance with one or more embodiments of the invention. The process of FIG. 9 may be used alone or in combination with the process of FIG. 3. One embodiment of FIG. 9 hides the decryption for the first block of the data stream. Another embodiment shown in FIG. 9 hides the decryption for the other blocks of the data stream as well. The decryption is hidden by decrypting a quantity of random or pseudo-random data prior to decrypting the first block, then decrypting the block, and then decrypting some additional quantity of random or pseudo-random data. In this embodiment, "random data" will be used to refer to implementations using random data and to implementations using pseudo-random data. The consistency of the decrypted data is checked after decrypting the random data. Another embodiment shown in FIG. 9 requires that the first block of the data stream contains a value that matches a pseudo-random number generated by the decrypting device or some other data consistency check, such as a checksum or message authentication code (MAC).

The first block of the encrypted data stream is input at step 352, and n blocks of pseudo-random data are generated at step 354. At step 356, the n blocks of pseudo-random data are decrypted, and after that decryption, the input block of the data stream is decrypted at step 358. An additional m blocks of pseudo-random data are generated at step 360, and those m blocks of pseudo-random data are decrypted at step 362. In one embodiment, n and m may be constant values. Alternatively, n and m may be pseudo-random values.

Step 364 checks the consistency of the decrypted block. If the decrypted block is not consistent, decision step 366 directs the process to step 368 where countermeasures (previously described) are taken in continuing decryption.

If the decrypted block is consistent, one alternative is to continue decryption of the remaining blocks of encrypted data as shown by step 370. If the attacker knows the correct first block and inserts his data in the second block, this attack may be addressed by repeating the process of decrypting pseudo-random data both before and after decrypting an all input blocks, as shown by steps 372 and 354-362.

In another alternative embodiment that addresses the scenario in which the attacker knows the correct first block and inserts his data in the second block, the decrypting circuit may generate a pseudo-random number and require that the first block include an encrypted version of the pseudo-random number. The process flow from step 362 to step 372 illustrates this embodiment. If the decrypted block is the first block, decision step 372 directs the process to step 374 where a pseudo-random number is generated. If the generated pseudo-random number matches the number present in the first block, decision step 376 directs the process back to step 364. Otherwise, the process is directed to step 368 for continuing decryption while taking counter measures.

Figure 10:
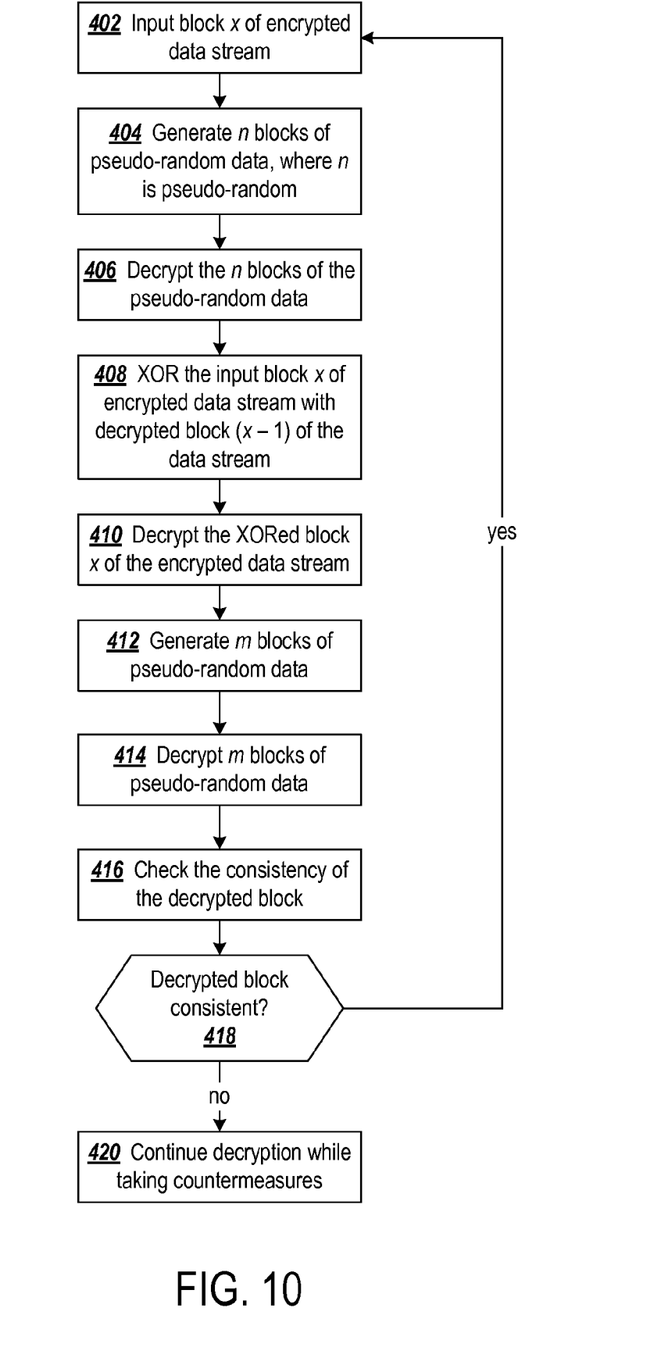
FIG. 10 is a flowchart of a process for decrypting data in accordance with another embodiment of the invention.

FIG. 10 is a flowchart of a process for decrypting data in accordance with another embodiment of the invention. The embodiment of FIG. 10 modifies the process of FIG. 8 by employing a method similar to cipher block chaining, though applied to ciphertext, in combination with hiding the decryption of an input block amongst decryption of pseudo-random data. The embodiment of FIG. 10 addresses the scenario in which the attacker knows the correct first block and inserts his data in the second block. Generally, in the embodiment of FIG. 10, the encrypted value of each block is dependent on the decrypted value of a previous block. During encryption, each block of ciphertext is XORed with a preceding block of plaintext and the result is the encrypted block of the data stream. For decryption, each block ciphertext is XORed with a previous block of plaintext, and that resulting block is decrypted.

At step 402, block x of the encrypted data stream in input. As described in the embodiment of FIG. 9, steps 404 and 406 generate n blocks of pseudo-random data and then decrypt that pseudo-random data. At step 408, the encrypted block x of the data stream is XORed with a previously decrypted block, for example block (x−1) of the data stream. Then at step 410, the resulting block from step 408 is decrypted. The decrypted block is saved for the XOR operation in the next iteration.

Steps 412 and 414 generate and decrypt m blocks of pseudo-random data as explained in the description of FIG. 9. Step 416 checks the consistency of the decrypted block. If the block is consistent, decision step 418 directs the process to step 402 to input the next block of encrypted data. Otherwise, decryption continues while taking one or more of the previously described counter measures at step 420.

Figure 11:
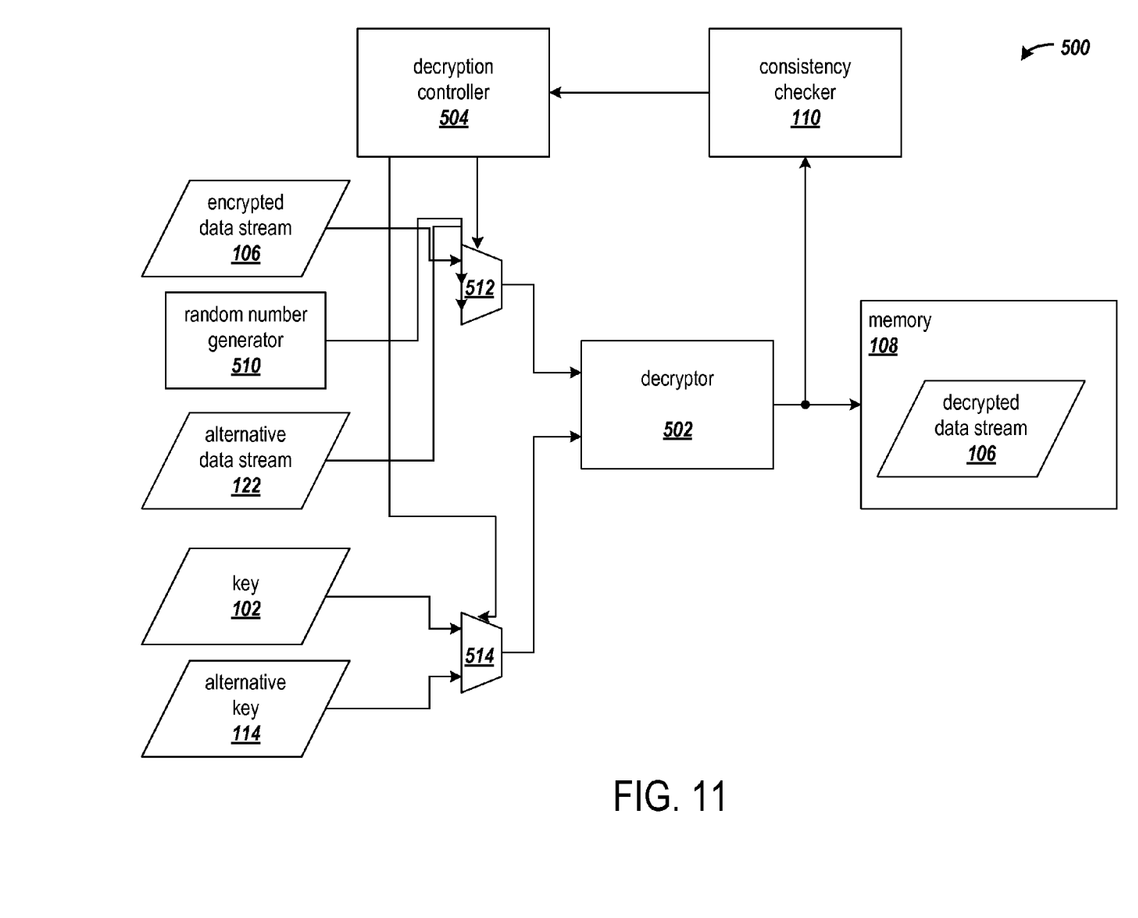
FIG. 11 is a block diagram of a decryption circuit arrangement in accordance with one or more embodiments of the invention.

FIG. 11 is a block diagram of a decryption circuit arrangement in accordance with one or more embodiments of the invention. The decryption circuit arrangement 500 of FIG. 11 is an example implementation of the embodiments described in FIGS. 9 and 10. The decryption circuit arrangement 500 includes decryptor 502, consistency checker 110, decryption controller 504, and memory 108. The consistency checker 110 functions as described in previous embodiments. The decryption circuit arrangement 500 further includes random number generator 510.

Decryption controller 504 controls the input of either the encrypted data stream 106, pseudo-random numbers from random number generator 510, or an alternative data stream 122 to the decryptor 502 via selector 512. In one embodiment, the decryptor inputs a block of the encrypted data stream followed by n pseudo-random numbers from the random number generator. Before decrypting the block of the encrypted data stream, the decryptor decrypts the n pseudo-random numbers. Then the block from the encrypted data stream is decrypted, and the decryption controller inputs m additional pseudo-random numbers to the decryptor. The decryptor then decrypts the m additional pseudo-random numbers. The consistency checker 110 checks the consistency of the decrypted block and signals the decryption controller as to whether the decrypted block is consistent or inconsistent. If the block is inconsistent, the decryption controller takes countermeasures by selecting the alternative key 114, the alternative data stream 122, or both for input to the decryptor. The decryptor then continues decryption with the selected inputs. If the decrypted block is consistent, the decryption controller selects another block from the encrypted data stream and the key 102 for input to the decryptor.

The decryption controller 504, decryptor 502, and consistency checker 110 may be alternatively configured according to the embodiments shown in FIGS. 9 and 10. In one embodiment, only the first block of the encrypted data stream has pseudo-random data decrypted before and after decrypting of the first block. Alternatively, the decryption controller may select pseudo-random data for the decryptor to decrypt around each block of the encrypted data stream. In another embodiment, the consistency checker may check for the presence of a pseudo-random number in the first block of the encrypted bitstream. The decryptor may be configured to XOR each input encrypted block of the data stream with the previous decrypted block of the data stream in another embodiment.

Figure 12:
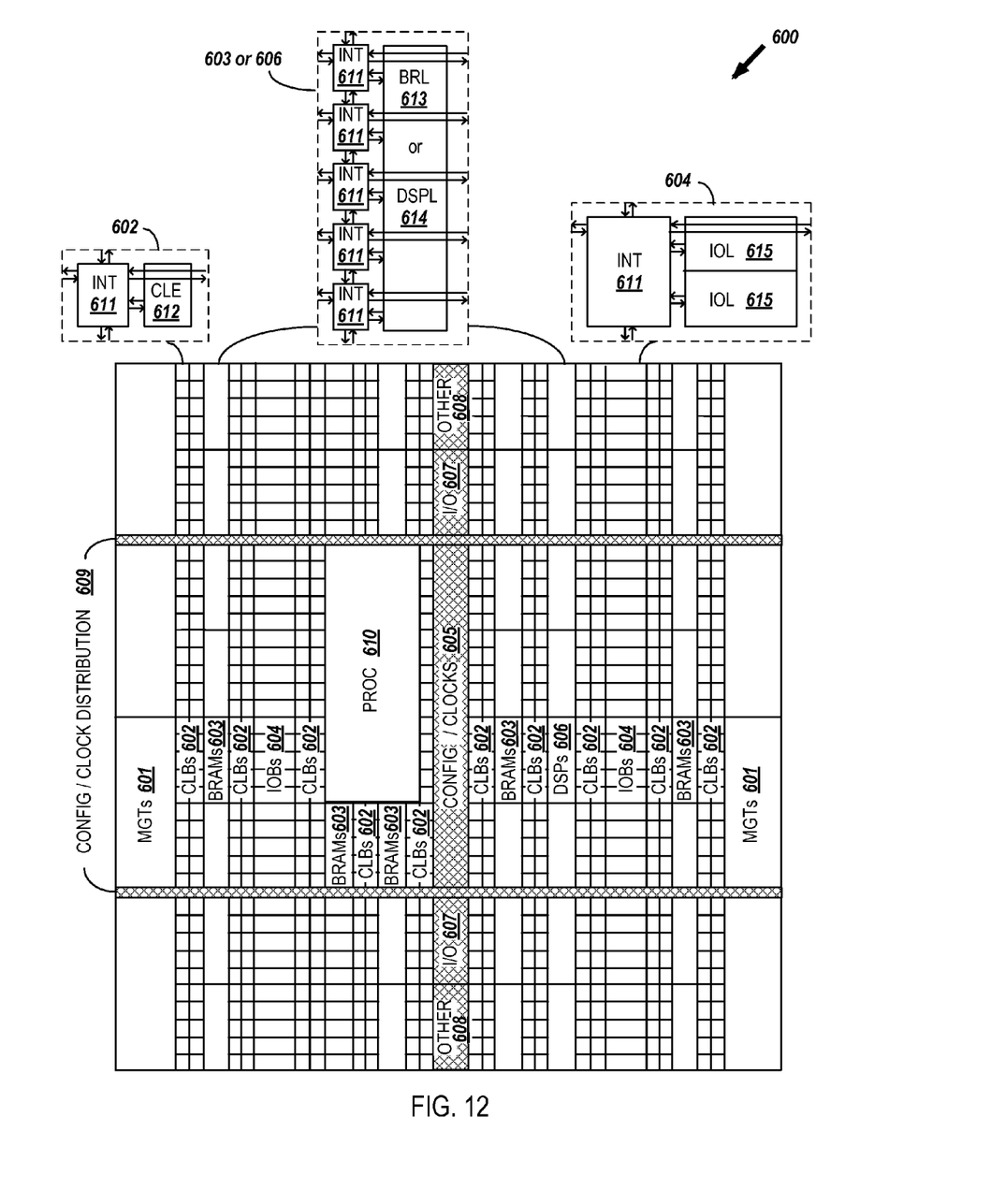
FIG. 12 is a block diagram of an example programmable logic integrated circuit that may be used in implementing a decryption circuit arrangement in accordance with one or more embodiments of the invention.

FIG. 12 is a block diagram of an example programmable logic integrated circuit that may be used in implementing a decryption circuit arrangement in accordance with one or more embodiments of the invention. The decryption circuit arrangement and other processes, as previously described, may be implemented on the programmable logic and interconnect resources of a programmable IC or as a hard-wired circuit on the programmable IC. Those skilled in the art will recognize that in alternative embodiments, programmed processors may be used to implement the processes described herein, and the embodiments are not limited to FPGA configuration bitstreams.

FPGAs can include several different types of programmable logic blocks in the array. For example, FIG. 12 illustrates an FPGA architecture (600) that includes a large number of different programmable tiles including multi-gigabit transceivers (MGTs 601), configurable logic blocks (CLBs 602), random access memory blocks (BRAMs 603), input/output blocks (IOBs 604), configuration and clocking logic (CONFIG/CLOCKS 605), digital signal processing blocks (DSPs 606), specialized input/output blocks (I/O 607), for example, e.g., clock ports, and other programmable logic 608 such as digital clock managers, analog-to-digital converters, system monitoring logic, and so forth. Some FPGAs also include dedicated processor blocks (PROC 610) and internal and external reconfiguration ports (not shown).

In some FPGAs, each programmable tile includes a programmable interconnect element (INT 611) having standardized connections to and from a corresponding interconnect element in each adjacent tile. Therefore, the programmable interconnect elements taken together implement the programmable interconnect structure for the illustrated FPGA. The programmable interconnect element INT 611 also includes the connections to and from the programmable logic element within the same tile, as shown by the examples included at the top of FIG. 12.

For example, a CLB 602 can include a configurable logic element CLE 612 that can be programmed to implement user logic plus a single programmable interconnect element INT 611. A BRAM 603 can include a BRAM logic element (BRL 613) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 606 can include a DSP logic element (DSPL 614) in addition to an appropriate number of programmable interconnect elements. An IOB 604 can include, for example, two instances of an input/output logic element (IOL 615) in addition to one instance of the programmable interconnect element INT 611. As will be clear to those of skill in the art, the actual I/O pads connected, for example, to the I/O logic element 615 are manufactured using metal layered above the various illustrated logic blocks, and typically are not confined to the area of the input/output logic element 615.

In the pictured embodiment, a columnar area near the center of the die (shown shaded in FIG. 12) is used for configuration, clock, and other control logic. Horizontal areas 609 extending from this column are used to distribute the clocks and configuration signals across the breadth of the FPGA.

Some FPGAs utilizing the architecture illustrated in FIG. 12 include additional logic blocks that disrupt the regular columnar structure making up a large part of the FPGA. The additional logic blocks can be programmable blocks and/or dedicated logic. For example, the processor block PROC 610 shown in FIG. 12 spans several columns of CLBs and BRAMs.

Note that FIG. 12 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 12 are purely exemplary. For example, in an actual FPGA more than one adjacent column of CLBs is typically included wherever the CLBs appear, to facilitate the efficient implementation of user logic.

In combination with or as an alternative to the circuit arrangements described above, the processes described herein may be implemented by a programmed microprocessor or an arrangement of two or more microprocessors.

One or more embodiments of the present invention is thought to be applicable to a variety of systems for protecting decryption keys and other data intended to be kept secret. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for protecting sensitive data from discovery during an operation performed on input data with the sensitive data, comprising:
    determining a ratio of 1 values and 0 values in a memory after the memory has transitioned from a power-off state to a power-on state;
    delaying performing the operation on a first quantity of random data until the ratio reaches a threshold;
    performing the operation on the first quantity of random data with the sensitive data using a circuit arrangement before performing the operation with the sensitive data on the input data using the circuit arrangement;
    after performing the operation with the sensitive data on the first quantity of the random data, performing the operation with the sensitive data on the input data using the circuit arrangement; and
    after performing the operation with the sensitive data on the input data, performing the operation with the sensitive data on a second quantity of random data using the circuit arrangement.

2. The method of claim 1, further comprising repeating for each of a plurality of blocks of input data, the performing of the operation on the first quantity of random data before performing the operation on the block, and the performing of the operation on the second quantity of random data after performing the operation on the block.

3. The method of claim 1, further comprising:
    checking success of the operation performed on the input data with the sensitive data; and
    in response to the operation on the input data with the sensitive data being successful, continuing processing of input data.

4. The method of claim 1, further comprising:
    wherein the input data includes an encrypted data stream;
    wherein the sensitive data is a decryption key, the operation includes decrypting with the key, and the performing the operation on the input data with the sensitive data includes decrypting a block of the input data into a decrypted block;
    checking consistency of the decrypted block; and
    in response to the decrypted block being inconsistent with an expected value, continuing decryption of the encrypted data stream using an alternative key.

5. The method of claim 1, further comprising:
    wherein the input data includes an encrypted data stream;
    wherein the sensitive data is a decryption key, the operation includes decrypting with the key, and the performing the operation on the input data with the sensitive data includes decrypting a block of the input data into a decrypted block;
    checking consistency of the decrypted block; and
    in response to the decrypted block being inconsistent with an expected value, continuing decryption using random data in place of the encrypted data stream.

6. The method of claim 1, further comprising:
    wherein the input data includes an encrypted data stream;
    wherein the sensitive data is a decryption key, the operation includes decrypting with the key, and the performing the operation on the input data with the sensitive data includes decrypting an encrypted block of the input data into a decrypted block; and
    applying a modification function to each input encrypted block of the data stream prior to decrypting the encrypted block, wherein the modification function generates a block to be decrypted as a function of the input encrypted block of the data stream and previously decrypted blocks.

7. The method of claim 1, further comprising:
    generating a pseudo-random number;
    determining whether or not the input data contains the pseudo-random number; and
    in response to the input data not containing the pseudo-random number, generating a signal indicating tampering is suspected.

8. The method of claim 1, further comprising:
    wherein the input data includes an encrypted data stream;
    wherein the sensitive data is a decryption key, the operation includes decrypting with the key, and the performing the operation on the input data with the sensitive data includes decrypting a block of the input data into a decrypted block;
    generating a pseudo-random number;

after decrypting a first block of the data stream, determining whether or not the decrypted first block contains the pseudo-random number; and in response to the decrypted block not containing the pseudo-random number, continuing decryption using random data instead of the encrypted data stream.

9. The method of claim 1, wherein the first quantity of the random data is a random quantity.

10. The method of claim 1, wherein the second quantity of the random data is a random quantity.

11. A circuit arrangement, comprising:
a controller configured to provide input data, sensitive data, and random data; and
a processing circuit coupled to receive the input data, the sensitive data, and the random data, the processing circuit configured to perform an operation with the sensitive data on a first quantity of the random data before performing the operation on the input data with the sensitive data and perform the operation with the sensitive data on a second quantity of the random data after performing the operation with the sensitive data on the input data;
a memory coupled to the controller;
wherein the controller is further configured to:
determine a ratio of 1 values and 0 values in a memory after the memory has transitioned from a power-off state to a power-on state; and
delay performing the operation on the first quantity of random data until the ratio reaches a threshold.

12. The circuit arrangement of claim 11, wherein the processing circuit is further configured to perform the operation on a quantity of random data with the sensitive data before and after performing the operation with the sensitive data on each block of the input data.

13. The circuit arrangement of claim 11, further comprising:
wherein the input data includes an encrypted data stream;
wherein the sensitive data is a decryption key, the operation includes decrypting with the key, and the performing the operation on the input data with the sensitive data includes decrypting the input data into decrypted data;
a consistency check circuit coupled to receive the decrypted data from the processing circuit and coupled to the controller, wherein the consistency check circuit is configured to check consistency, before the processing circuit completes decryption of the input data, between a portion of the decrypted data and expected data, and generate a tampering signal indicating tampering is suspected in response to finding an inconsistency; and
wherein the controller, responsive to the tampering signal, selects an alternative key instead of the decryption key for input to the processing circuit.

14. The circuit arrangement of claim 13, further comprising:
wherein the input data includes an encrypted data stream;
wherein the sensitive data is a decryption key, the operation includes decrypting with the key, and the performing the operation on the input data with the sensitive data includes decrypting the input data into decrypted data;
a consistency check circuit coupled to receive the decrypted data from the processing circuit and coupled to the controller, wherein the consistency check circuit is configured to check consistency, before the processing circuit completes decryption of the input data, between a portion of the decrypted data and expected data, and generate a tampering signal indicating tampering is suspected in response to finding an inconsistency; and
wherein the decryption controller, responsive to the tampering signal, selects an alternative data stream instead of the encrypted data stream, for input to the processing circuit.

15. The circuit arrangement of claim 1, wherein the processing circuit is further configured to apply a modification function to each input encrypted block of the data stream prior to decrypting the encrypted block, wherein the modification function generates a block to be decrypted as a function of the input encrypted block of the data stream and previously decrypted blocks.

16. The circuit arrangement of claim 11, further comprising:
wherein the input data includes an encrypted data stream;
wherein the sensitive data is a decryption key, the operation includes decrypting with the key, and the performing the operation on the input data with the sensitive data includes decrypting the input data into decrypted data blocks;
a consistency check circuit coupled to receive the decrypted data from the processing circuit and coupled to the controller, wherein the consistency check circuit is configured to generate a pseudo-random number and determine whether or not a decrypted first block of the decrypted data contains the pseudo-random number, and in response to the decrypted first block not containing the pseudo-random number, generate a tampering signal indicating tampering is suspected;
wherein the controller, responsive to the tampering signal, selects an alternative key instead of the decryption key for input to the processing circuit.

17. The circuit arrangement of claim 11, further comprising:
wherein the input data includes an encrypted data stream;
wherein the sensitive data is a decryption key, the operation includes decrypting with the key, and the performing the operation on the input data with the sensitive data includes decrypting the input data into decrypted data blocks;
a consistency check circuit coupled to receive the decrypted data from the processing circuit and coupled to the decryption controller, wherein the consistency check circuit is configured to generate a pseudo-random number and determine whether or not a decrypted first block of the decrypted data contains the pseudo-random number, and in response to the decrypted first block not containing the pseudo-random number, generate a tampering signal indicating tampering is suspected;
wherein the controller, responsive to the tampering signal, provides random data instead of the encrypted data stream for input to the processing circuit.

18. The circuit arrangement of claim 11, wherein at least one of the controller and processing circuit are implemented in a microprocessor.

* * * * *